United States Patent
Yamamoto et al.

(10) Patent No.: US 8,674,936 B2
(45) Date of Patent: Mar. 18, 2014

(54) OPERATION INPUT DEVICE AND METHOD, PROGRAM, AND ELECTRONIC APPARATUS

(75) Inventors: Kazuyuki Yamamoto, Kanagawa (JP); Takurou Noda, Tokyo (JP); Ikuo Yamano, Tokyo (JP)

(73) Assignee: Sony Corporation, Tokyo (JP)

( * ) Notice: Subject to any disclaimer, the term of this patent is extended or adjusted under 35 U.S.C. 154(b) by 729 days.

(21) Appl. No.: 12/909,251

(22) Filed: Oct. 21, 2010

(65) Prior Publication Data
US 2011/0148763 A1    Jun. 23, 2011

(30) Foreign Application Priority Data

Dec. 17, 2009   (JP) ................... 2009-286218

(51) Int. Cl.
*G09G 5/00* (2006.01)
(52) U.S. Cl.
USPC ........................................ 345/156; 345/173
(58) Field of Classification Search
USPC ................................... 345/156–173
See application file for complete search history.

(56) References Cited

U.S. PATENT DOCUMENTS

| | | | |
|---|---|---|---|
| 6,577,299 B1* | 6/2003 | Schiller et al. | 345/179 |
| 2001/0033272 A1* | 10/2001 | Yoshimura et al. | 345/173 |
| 2005/0140645 A1* | 6/2005 | Ueshima | 345/156 |
| 2005/0253806 A1* | 11/2005 | Liberty et al. | 345/156 |
| 2006/0146015 A1* | 7/2006 | Buchmann | 345/156 |
| 2007/0002015 A1* | 1/2007 | Mohri et al. | 345/157 |
| 2009/0111580 A1* | 4/2009 | Nakajima | 463/37 |
| 2009/0122007 A1* | 5/2009 | Tsuzaki et al. | 345/156 |
| 2010/0013860 A1* | 1/2010 | Mandella et al. | 345/650 |

OTHER PUBLICATIONS

Wacom Tablet Homepage, Printed Aug. 10, 2010, URL:http://tablet.wacom.co.jp/index.html, 1 page.

* cited by examiner

*Primary Examiner* — Viet Pham
(74) *Attorney, Agent, or Firm* — Oblon, Spivak, McClelland, Maier & Neustadt, L.L.P.

(57) ABSTRACT

An operation input device includes: angular velocity detecting means for detecting an angular velocity; relative velocity detecting means for contactlessly detecting a relative velocity to a target object; distance detecting means for detecting a distance to the target object; and computing means for computing an amount of movement based on the angular velocity, the relative velocity, and the distance.

14 Claims, 14 Drawing Sheets

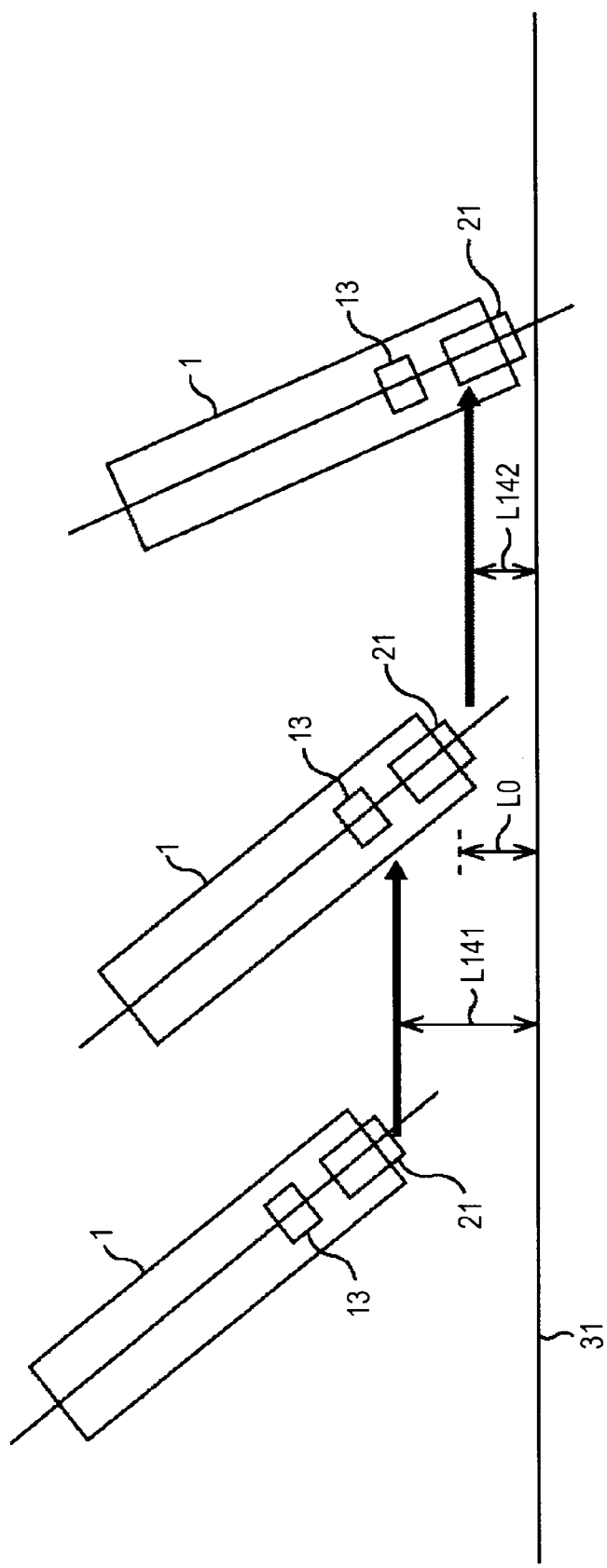

OPERATION INPUT DEVICE AND METHOD, PROGRAM, AND ELECTRONIC APPARATUS

BACKGROUND OF THE INVENTION

1. Field of the Invention

The present invention relates to an operation input device and method, a program, and electronic apparatus, and specifically, to an operation input device and method, a program, and electronic apparatus that realize input with good operability.

2. Description of the Related Art

In personal computers, as controllers of GUI (Graphical User Interface), pointing devices such as mice and touch pads are mainly used.

Recently, in television receivers, in order to deal with the complexity of operation by addition of additional functions and networking, free cursor operation input devices of the same GUI as that of the personal computers have been desired.

However, it takes significant time to master input devices such as mice and touch pads, and it is difficult for young children and elderly people to adapt to them.

As input devices advantageous in operability to solve the problem, pen-shaped input devices usable either in proximity or contact are suggested.

As a representative of the devices, pen tablets using electromagnetic induction have been put into practical use (for example, Wacom|Tablet Homepage, Internet<URL:http://tablet.wacom.co.jp/index.html>).

SUMMARY OF THE INVENTION

However, in a technique disclosed in Wacom|Tablet Homepage, operation may be performed only on a tablet for exclusive use.

In addition, a method of printing a special pattern on paper and obtaining coordinates by imaging the pattern using an imaging sensor and a method of determining the position of the pen using an ultrasonic generator, a magnetic generator, or an infrared generator externally provided have begun to be suggested and commercialized. However, there are restraint conditions that operation may be performed only on the special paper and operation may be performed only near the external generator, and they deteriorate the operability.

Thus, it is desirable to realize input with good operability.

According to an embodiment of the invention, there is provided an operation input device and an operation input method including angular velocity detecting means for detecting an angular velocity, relative velocity detecting means for contactlessly detecting a relative velocity to a target object, distance detecting means for detecting a distance to the target object, and computing means for computing an amount of movement based on the angular velocity, the relative velocity, and the distance, and a program or electronic apparatus for allowing a computer to function as the operation input device.

The relative velocity detecting means may include light emitting means for emitting light to illuminate the target object, and imaging means for imaging the target object irradiated with the light from the light emitting means, and the distance detecting means may detect the distance based on an image imaged by the imaging means.

The operation input device may further include contact detecting means for detecting contact with the target object.

The contact detecting means may detect two-step contact.

The operation input device may further include a buffer material that suppresses transfer of vibration generated at contact with the target object to the angular velocity detecting means.

If the distance to the target object is equal to or more than a reference range, screen operation may be stopped, if the distance to the target object is less than the reference range, screen operation may be executed, and, if there is contact with the target object, special operation may be executed.

If the distance to the target object is equal to or more than a reference range, first screen operation may be executed, and, if the distance to the target object is within the reference range, second screen operation may be executed.

If the distance to the target object is equal to or more than a first range within the reference range, screen operation based on a first physical quantity may be executed, and, if the distance to the target object is less than the first range within the reference range, screen operation based on a second physical quantity may be executed.

The operation input device may further include frequency detecting means for detecting a frequency of vibration at sliding if there is contact with the target object, and acquiring means for acquiring a correction value based on the frequency detected by the frequency detecting means, and the computing means may compute a velocity at the sliding based on the correction value and the angular velocity.

The frequency detecting means may detect the frequency of the vibration at the sliding from sound. The frequency of the vibration at the sliding may be detected from vibration propagated via component elements.

The frequency detecting means may be the angular velocity detecting means, and the angular velocity detecting means may further detect the frequency of vibration at sliding.

The operation input device may further include gesture detecting means for detecting a gesture based on the angular velocity if there is contact with the target object. Further, the gesture detecting means may detect a gesture based on an image imaged by the imaging means.

In the embodiment of the invention, the angular velocity is detected, the relative velocity to the target object is contactlessly detected, the distance to the target object is detected, and the amount of movement is computed based on the angular velocity, the relative velocity, and the distance.

According to the embodiment of the invention, input with good operability may be realized.

BRIEF DESCRIPTION OF THE DRAWINGS

FIG. 13 shows an outline of an operation of the operation input device.

DESCRIPTION OF PREFERRED EMBODIMENTS

Configuration of Operation Input Device

Figure 1A:
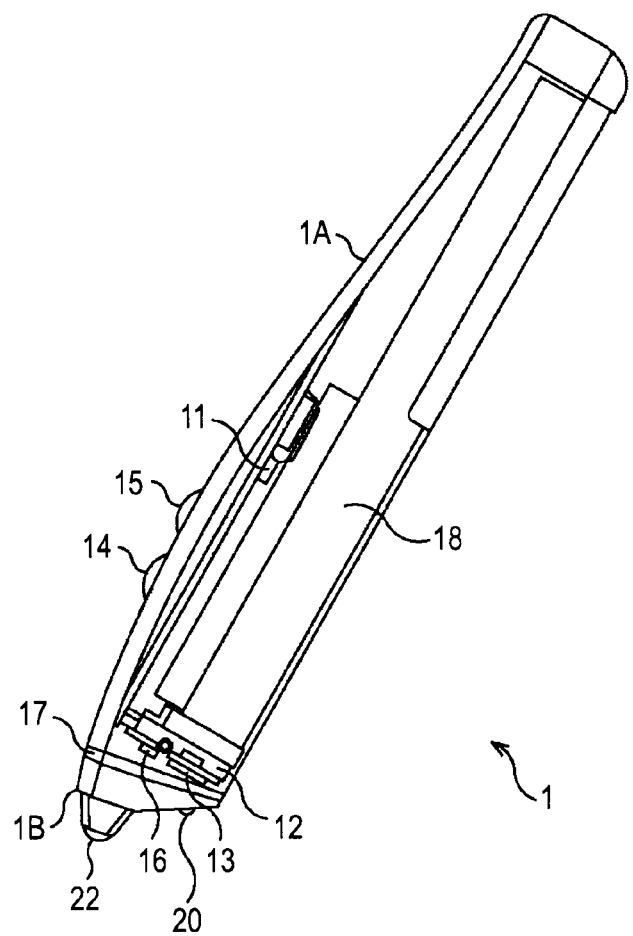
FIGS. 1A and 1B show a configuration example as one embodiment of an operation input device to which the invention is applied.
Figure 1B:
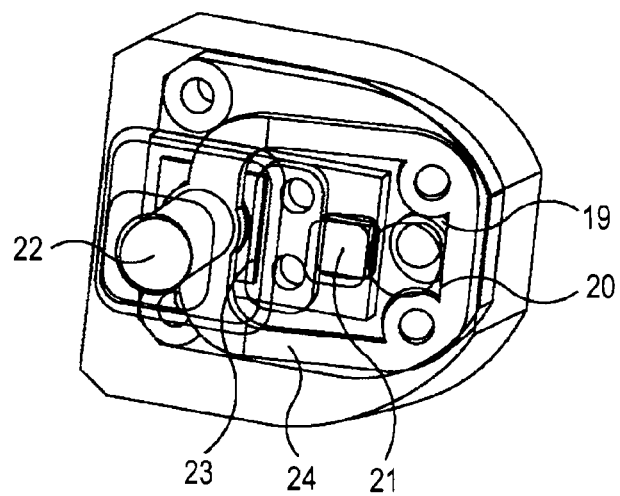

FIGS. 1A and 1B show a configuration example as one embodiment of an operation input device 1 to which the invention is applied. The operation input device 1 is operated by a user when a predetermined command is input to a television receiver, for example. That is, the operation input device 1 functions as a remote controller of the television receiver. FIG. 1A shows an overall configuration of the operation input device 1. FIG. 1B shows details of a configuration of an end part of the operation input device 1.

As shown in FIGS. 1A and 1B, the pen-shaped operation input device 1 includes a main board 11, a sensor board 12, an angular velocity sensor 13, a power switch 14, a button 15, a microphone 16, a buffer material 17, a battery 18, a light emitting part 19, a lens 20, an image sensor 21, a contact part 22, a tactile switch 23, and a spring 24.

On the main board 11, a microcomputer 71, which will be described later with reference to FIG. 4, etc. are mounted.

On the sensor board 12, the angular velocity sensor 13, the microphone 16, the image sensor 21, etc. are mounted.

The angular velocity sensor 13 as angular velocity detecting means detects an angular velocity when the operation input device 1 is operated. The angular velocity sensor 13 includes a gyro sensor or the like, for example.

Note that, using an acceleration sensor in place of the angular velocity sensor 13, an angular velocity may be obtained by differentiating its output. Specifically, the acceleration sensor measures acceleration in directions of three axes of X, Y, Z axes. Then, an angular velocity may be obtained by calculating a tilt angle relative to the gravity vector direction from the acceleration measured on the respective axes and differentiating the calculated tilt angle with respect to time.

The power switch 14 is connected to the main board 11, and operated by the user when power is turned on or off.

The button 15 is connected to the main board 11. The button 15 is operated when the user performs predetermined input.

The microphone 16 is connected to the sensor board 12. The microphone 16 collects vibration sound at sliding of the operation input device 1.

The buffer material 17 is sandwiched between a casing 1A that supports the angular velocity sensor 13 and a casing 1B that supports the contact part 22. The buffer material 17 suppresses transfer of vibration generated when the contact part 22 comes into contact with a target object from the casing 1B to the casing 1A, and to the angular velocity sensor 13.

The battery 18 is connected to the main board 11. When the power switch 14 is turned on, the battery supplies necessary power to the respective parts.

The light emitting part 19 as light emitting means irradiates the target object with parallel light via the lens 20. For example, the light emitting part 19 includes an LED (Light Emitting Diode), a semiconductor laser, or the like.

The image sensor 21 as relative velocity detecting means and imaging means images an image containing the target object irradiated with the light. For example, the image sensor 21 includes a CCD (Charge Coupled Device) image sensor, a CMOS (Complementary Metal Oxide Semiconductor) image sensor, or the like.

The contact part 22 as contact detecting means is supported by one end of the spring 24 with the other end supported by the casing 1B, and urged by the spring 24 in a direction projecting outward. When coming into contact with the target object, the contact part 22 moves rearward against the urging force of the spring 24 and turns on the tactile switch 23 located at the rear side. When moving away from the target object, the contact part 22 returns to the original position by the urging force of the spring 24 and turns off the tactile switch 23.

In the embodiment, two values of on/off are detected by the tactile switch 23, or the on-stage is divided into two steps and three values are detected. Alternatively, using a pressure sensor, processing based on pressure may be executed.

Figure 2:
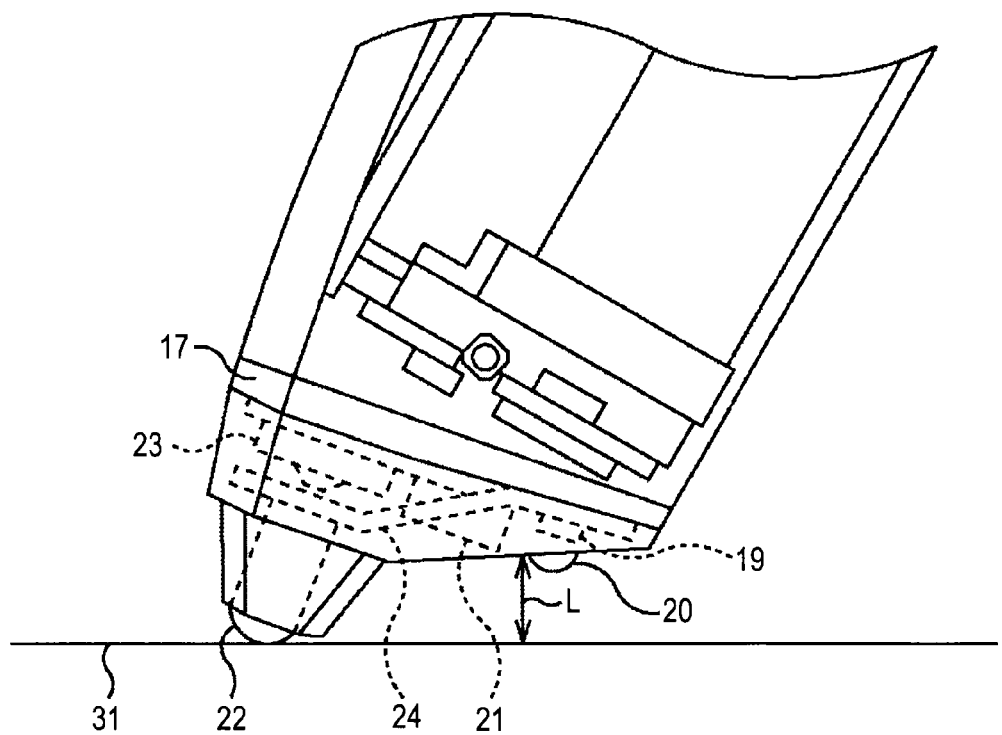
FIG. 2 shows details of the operation input device.

FIG. 2 is an enlarged view of an end part of the operation input device 1. The contact part 22 is in contact with a target object 31. Concurrently, the image sensor 21 is separated from the target object 31 at a distance L. That is, when the operation input device 1 is in contact with the target object 31, the distance L between the image sensor 21 and the target object 31 takes a value larger than zero.

Figure 3:
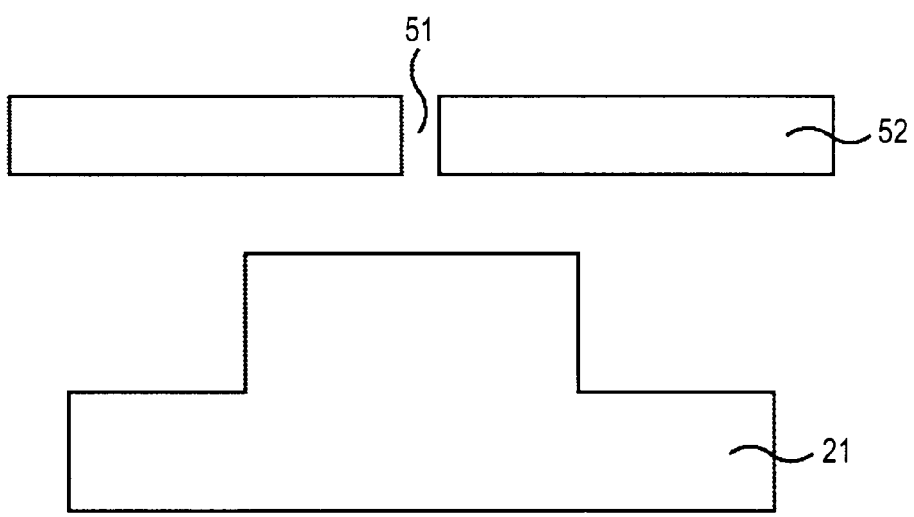
FIG. 3 shows details of an image sensor.

FIG. 3 shows details of the image sensor 21.

In front of the image sensor 21, a lens with deep depth of field (not shown) may be provided. Note that, in the embodiment, as an alternative of the lens, a pinhole plate 52 with a pinhole 51 formed therein is provided. Thereby, within the range of the depth of field, focus may be obtained independent of the distance.

Figure 4:
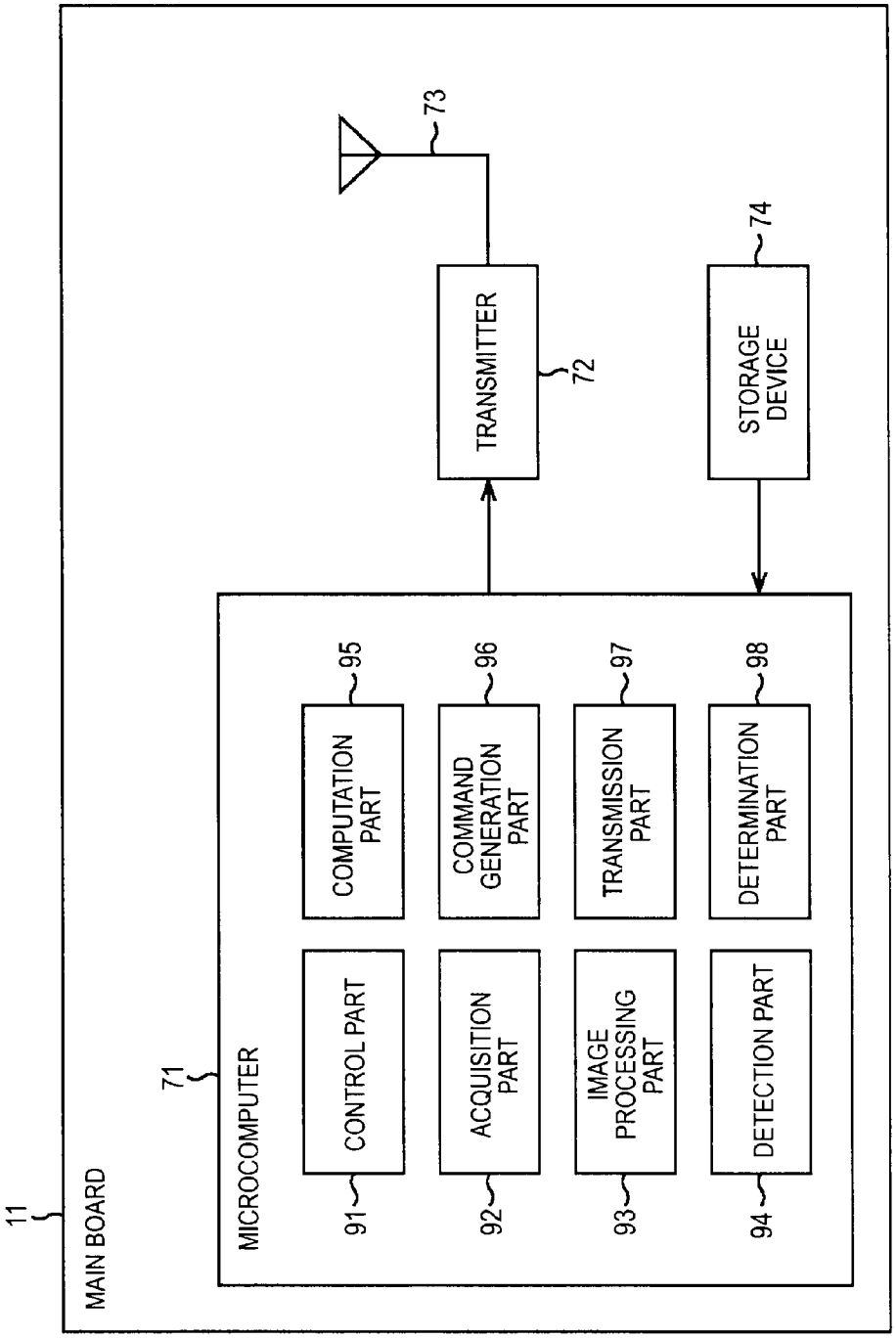
FIG. 4 is a block diagram showing a configuration example of a main board of the operation input device.

FIG. 4 is a block diagram showing a configuration example of the main board 11 of the operation input device 1 in FIGS. 1A and 1B.

In the example of FIG. 3, on the main board 11, the microcomputer 71, a transmitter 72, an antenna 73, and a storage device 74 are mounted. The microcomputer 71 has functional blocks of a control part 91, an acquisition part 92, an image processing part 93, a detection part 94, a computation part 95, a command generation part 96, a transmission part 97, and a determination part 98. The respective blocks of the microcomputer 71 can send and receive signals (data) between one another according to need.

The control part 91 of the microcomputer 71 performs processing of control of the angular velocity sensor 13 and the image sensor 21 and the like. The acquisition part 92 acquires various information from the angular velocity sensor 13, the image sensor 21, the storage device 74, the detection part 94, and the computation part 95. The image processing part 93 performs processing of extracting data from the image necessary in the detection part 94 and the computation part 95. The detection part 94 as distance detecting means detects a distance between the operation input device 1 and the target object. Further, the detection part 94 detects various information from the storage device 74 based on the information acquired by the acquisition part 92. The computation part 95 as computing means computes an amount of movement of the operation input device 1. The command generation part 96 generates a command based on the distance between the operation input device 1 and the target object. The transmission part 97 transmits various information to a receiving device (not shown). The determination part 98 determines whether the various information satisfies a condition or not.

The transmitter 72 transmits various information to a receiving device (not shown) such as a television receiver via the antenna 73 according to the control of the transmission part 97. The various information includes the amount of movement of the operation input device 1, commands, etc.

In the storage device 74, information corresponding to the various sensor information is defined in advance and stored. The storage device 74 may be provided within the main board 11 or provided in the receiving device (not shown).

[Velocity Computation Processing]

Next, with reference to FIGS. 5 to 7B, the velocity computation processing of the operation input device 1 will be explained. This processing is processing performed at step S23 in FIG. 8, which will be described later, but explained in advance for convenience.

Figure 5:
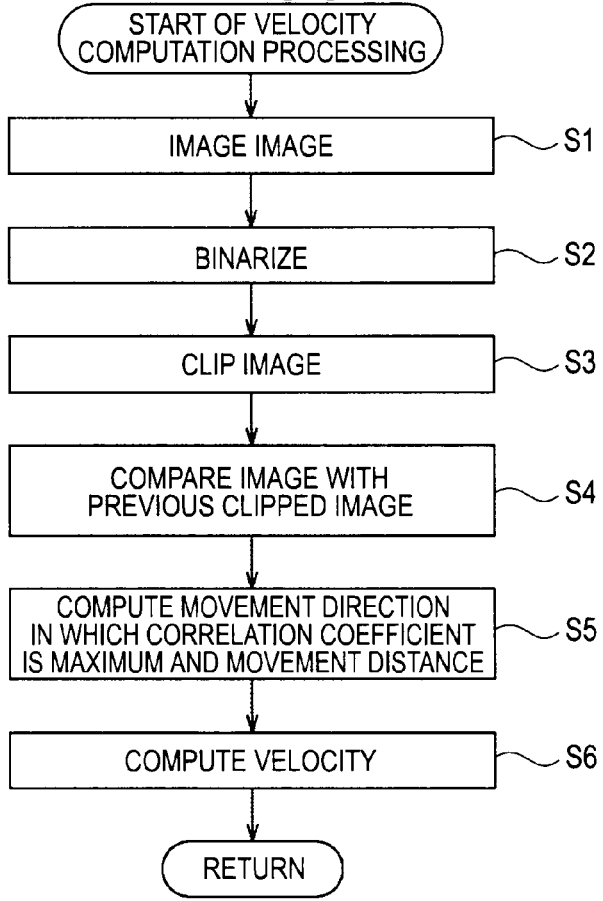
FIG. 5 is a flowchart for explanation of velocity computation processing of the operation input device.

FIG. 5 is a flowchart for explanation of the velocity computation processing of the operation input device 1. In the embodiment, the direction and the amount in which the operation input device 1 has moved is detected based on the image imaged by the image sensor 21, and the velocity of the operation input device 1 is computed.

When moving a cursor displayed on the television receiver (not shown), for example, the user translates the operation input device 1 on the target object 31. The target object 31 may be a desk, a table, a sofa, a hand of the user, a trouser (the thigh of the user sitting there), or the like.

Figure 6:
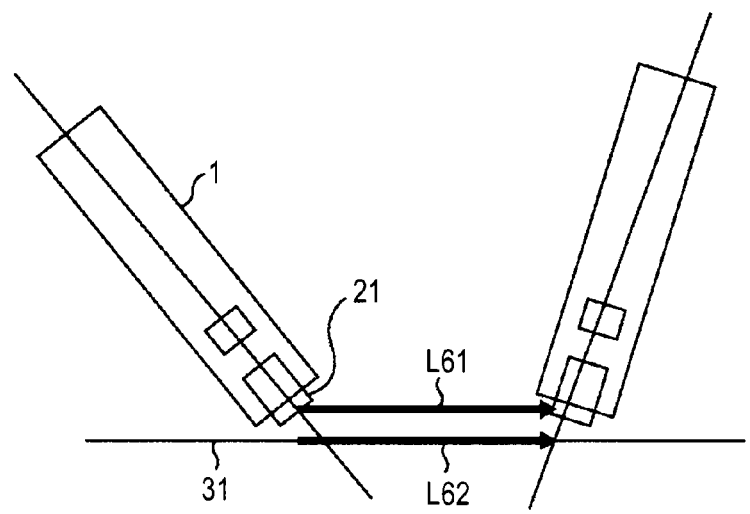
FIG. 6 shows an outline of an operation of the operation input device.

FIG. 6 shows movement of the operation input device 1 when the operation input device 1 is in contact with the target object 31. Though the illustration is omitted, in FIG. 6, the contact part 22 is in contact with the target object 31. Further, in FIG. 6, the illustration of the contact part 22 is omitted. This is applicable to FIG. 9, FIG. 11, and FIG. 13, which will be described later.

In FIG. 6, a movement distance per unit time (i.e., velocity) of the operation input device 1 is indicated by a distance L61. Further, in FIG. 6, a movement distance per unit time obtained from the image sensor 21 is indicated by a distance L62.

When the operation input device 1 is in contact with the target object 31, the distance between the image sensor 21 and the target object 31 is short enough, and the distance L62 is nearly equal to the distance L61.

The distance L61 and the distance L62 are movement distances per unit time, however, they may be movement distances per sampling time by the image sensor 21.

When the distances are movement distances per sampling time, the velocity of the operation input device 1 (i.e., the relative velocity to the target object 31) is obtained by dividing the distance L61 or the distance L62 by the sampling time.

At step S1 of FIG. 5, the acquisition part 92 acquires an image from the image sensor 21. This image is an image of the target object 31 irradiated with light via the lens 20 by the light emitting part 19.

At step S2, the image processing part 93 binarizes the image. Through the binarization processing, in the image, the range irradiated with light is "1", for example, and the range not irradiated with light is "0", for example.

At step S3, the image processing part 93 clips the image in the range irradiated with light.

At step S4, the image processing part 93 compares the clipped image with an image clipped one unit time before. The clipped images are shown in FIGS. 7A and 7B, for example.

Figure 7A:
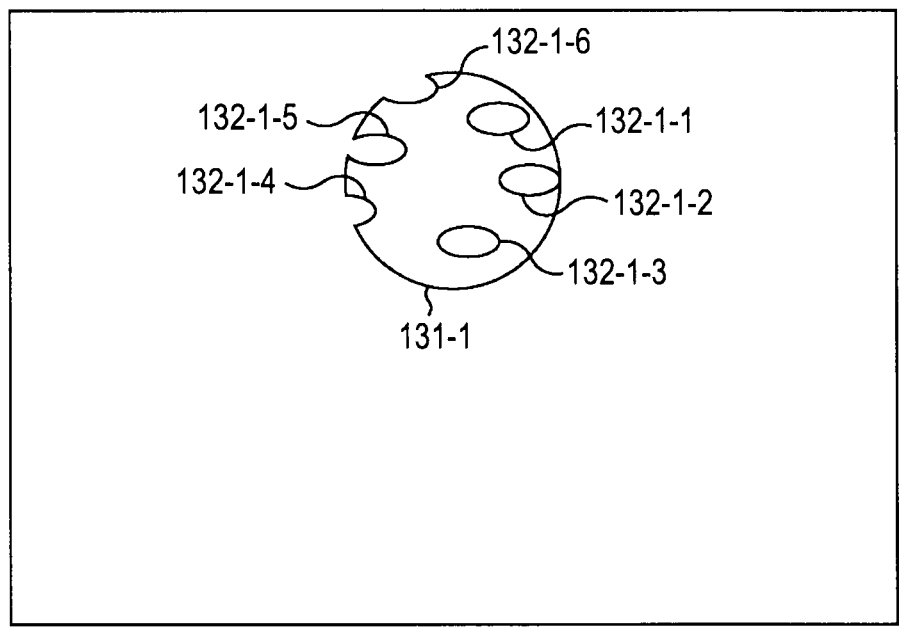
FIGS. 7A and 7B show examples of imaged images.
Figure 7B:
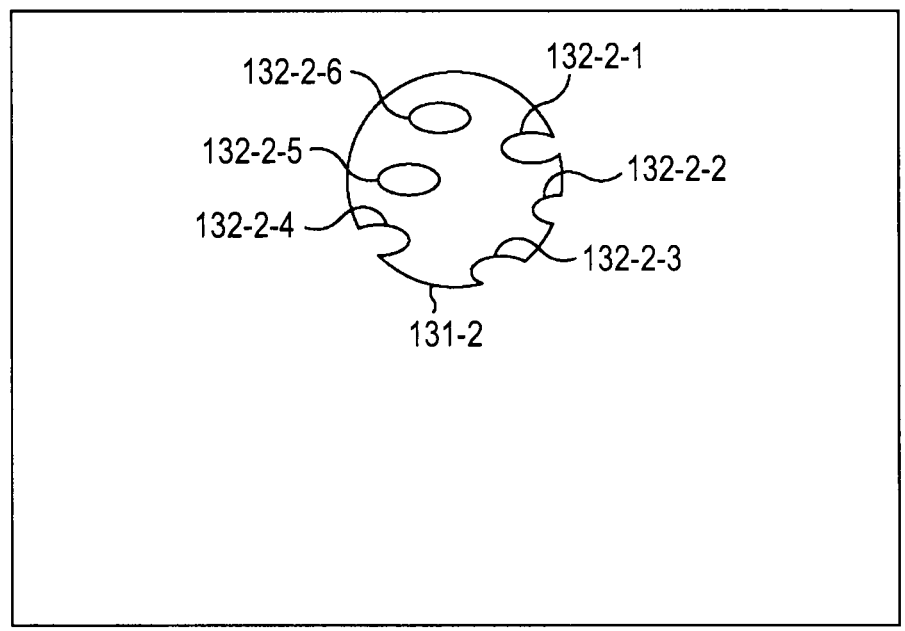

FIGS. 7A and 7B show examples of images of frames imaged by the image sensor 21. FIG. 7A shows an image of a frame clipped one unit time before, and FIG. 7B shows an image of a frame clipped at the present time. In FIGS. 7A and 7B, bright spots 131-1, 131-2 corresponding to ranges irradiated with light and marks 132-1-1 to 132-1-6, 132-2-1 to 132-2-6 of the target object 31 are shown. Because of irradiation of light, the image of the marks 132 of the target object 31 may be obtained even when the usage environment is dark. Further, by providing a wavelength selection filter that passes only the wavelength of light radiated by the light emitting part 19 in front of the image sensor 21, even when the usage environment is light, the influence of disturbance light may be reduced.

The marks 132-2-1 to 132-2-6 correspond to the marks 132-1-1 to 132-1-6.

Hereinafter, if it is unnecessary to individually distinguish the marks 132-1-1 to 132-1-6, 132-2-1 to 132-2-6 of the target object 31, they may collectively be referred to as the marks 132 of the target object 31. The marks 132 of the target object 31 may be marks of a table, marks of cloths, marks of fabrics, or the like, for example.

The image processing part 93 moves the image of the bright spot 131-2 of FIG. 7B in all directions and obtains a position where the correlation coefficient with the bright spot 131-1 of FIG. 7A becomes the maximum.

In FIG. 7A, all of the marks 132-1-1 to 132-1-3 are within the bright spot 131-1, and parts of the marks 132-1-4 to 132-1-6 are contained within the bright spot 131-1. In FIG. 7B, parts of the marks 132-2-1 to 132-2-4 are contained within the bright spot 131-2, and all of the marks 132-2-5, 132-2-6 are within the bright spot 131-2.

Accordingly, it is known that the bright spot 131-2 of FIG. 7B has moved from the position of the bright spot 131-1 of FIG. 7A toward the marks 132-2-5, 132-2-6. That is, it is known that the operation input device 1 has moved from the position in FIG. 7A toward the upper left.

At step S5 of FIG. 5, the computation part 95 computes the movement direction in which the correlation coefficient is the maximum and the movement distance. The bright spot 131-2 of FIG. 7B has the maximum correlation coefficient toward the upper left of the FIG. 7A, and the movement distance in the direction is computed. The movement distance is obtained from the distance between the positions of the bright spot 131-1 and the bright spot 131-2 within the frame of the image sensor 21.

At step S6, the computation part 95 computes a velocity. Specifically, the velocity is obtained by dividing the distance computed at step S5 by unit time.

[Command Transmission Processing]

Next, processing of transmitting a command of the operation input device 1 will be explained.

Figure 8:
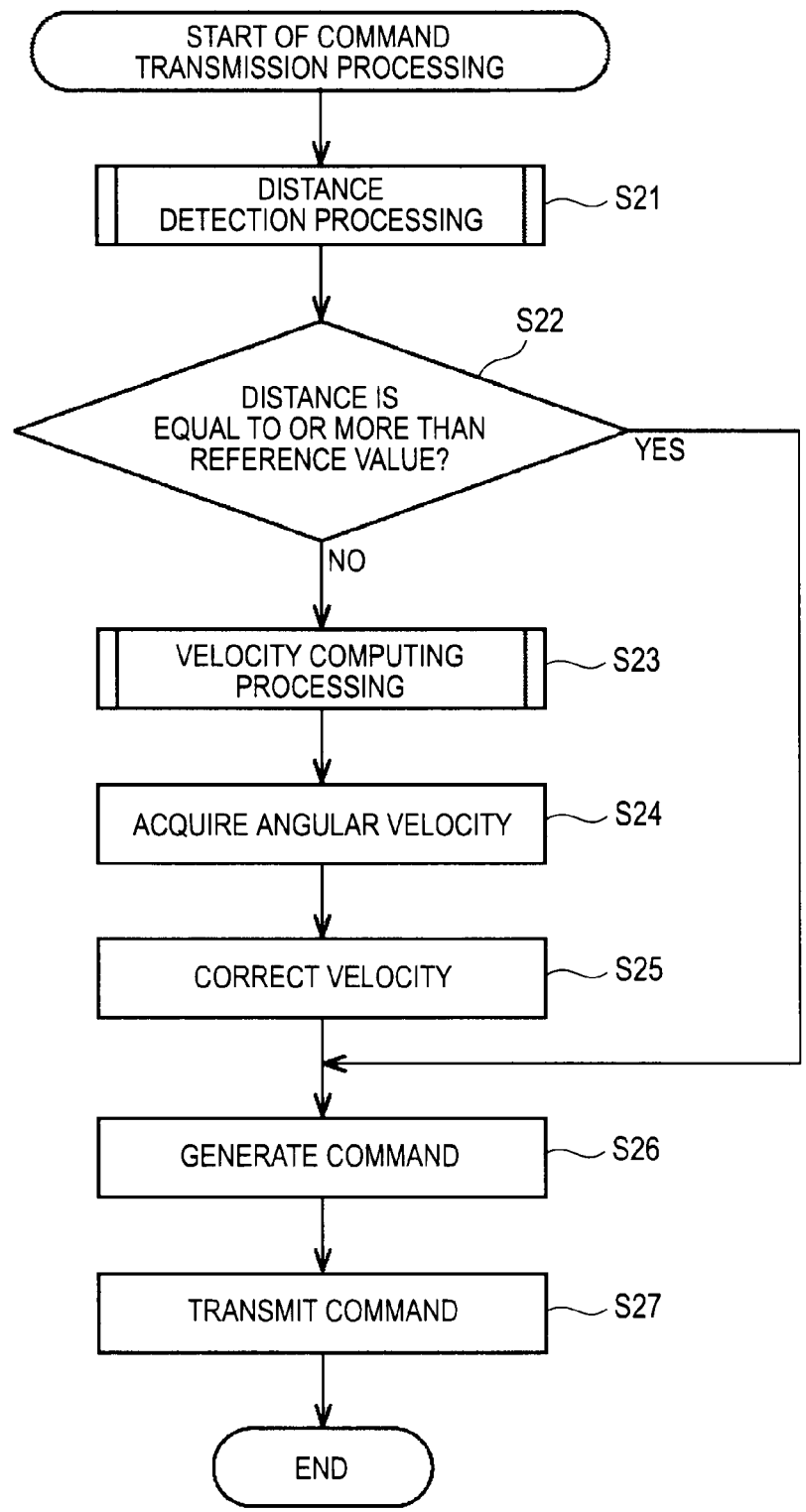
FIG. 8 is a flowchart for explanation of command transmission processing of the operation input device.

FIG. 8 is a flowchart for explanation of the command transmission processing of the operation input device 1.

Figure 9:
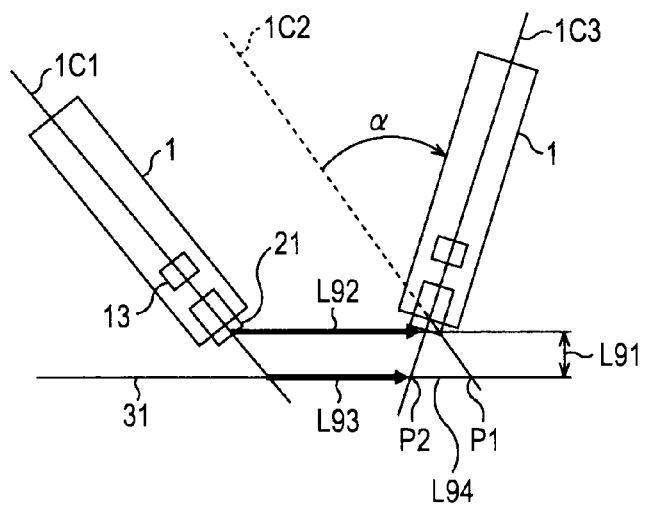
FIG. 9 shows an outline of an operation of the operation input device.

When moving the cursor displayed on the television receiver, for example, the user moves the operation input device 1 in the proximity of the target object 31 in a predetermined direction in parallel to the target object 31 as shown in FIG. 9.

At step S21, the detection part 94 detects the distance between the image sensor 21 and the target object 31.

[Distance Detection Processing]

Here, referring to a flowchart of FIG. 10, distance detection processing of the operation input device 1 will be explained in detail.

Figure 10:
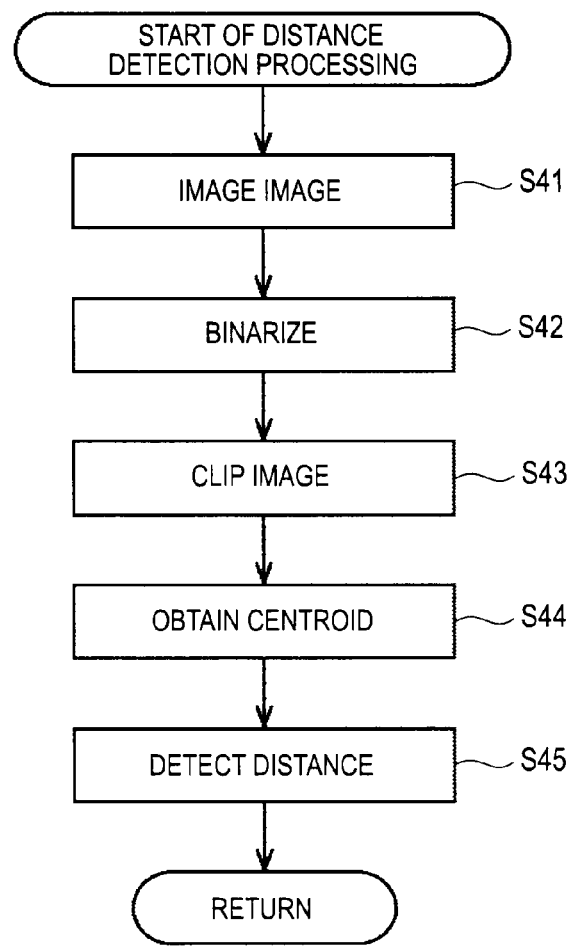
FIG. 10 is a flowchart for explanation of distance detection processing of the operation input device.

FIG. 10 is a flowchart for explanation of the detection processing of the operation input device 1. In the example of FIG. 10, the target object 31 irradiated with light emitted by the light emitting part 19 is imaged by the image sensor 21, image processing is executed thereon, and the distance between the image sensor 21 and the target object 31 is detected.

Figure 11:
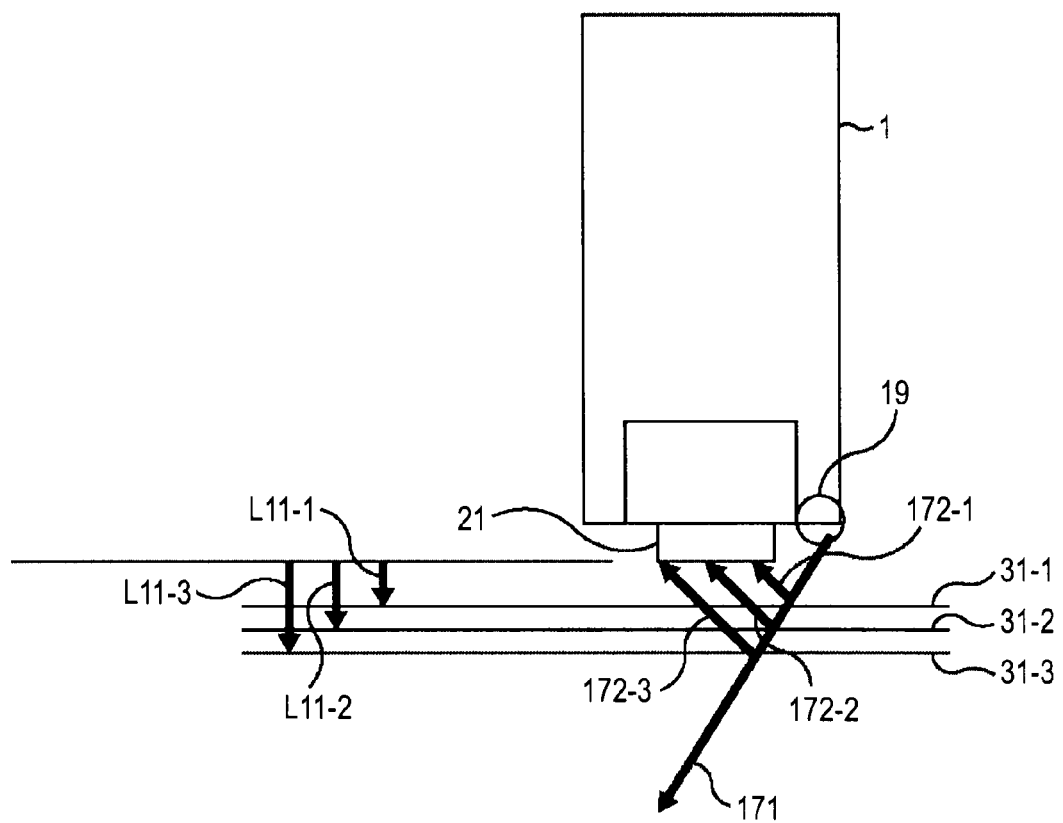
FIG. 11 shows a principle of the distance detection processing.

FIG. 11 shows a principle of detecting the distance between the image sensor 21 and the target object 31. FIG. 11 is a diagram showing detection of the distances to the positions in which the target object 31 is respectively shown as the target objects 31-1 to 31-3 from the image sensor 21.

The light emitting part 19 radiates irradiation light 171 as parallel light at a fixed angle via the lens 20.

The irradiation light 171 is respectively reflected by the target objects 31-1 to 31-3 and enters the image sensor 21 as reflected light 172-1 to 172-3.

For example, when the target object 31-1 is irradiated with the irradiation light 171, the incident position of the reflected light 172-1 on the image sensor 21 is a position near the light emitting part 19.

On the other hand, the incident position of the reflected light 172-2 by the target object 31-2 farther than the target object 31-1 is a position farther from the light emitting part 19 than the incident position of the reflected light 172-1. The incident position of the reflected light 172-3 by the target object 31-3 even farther than the target object 31-2 is a position farther from the light emitting part 19 than the incident position of the reflected light 172-2. Therefore, the distance of the target object 31 from the image sensor 21 may be detected from the incident position of the reflected light 172.

Returning to FIG. 10, processing at steps S41 to S43 of the operation input device 1 is the same as the processing at steps S1 to S3 of the operation input device 1 in FIG. 5. Accordingly, the detailed explanation of the processing will appropriately be omitted for avoiding a repetition.

That is, at step S41, the acquisition part 92 acquires an image from the image sensor 21. At step S42, the image processing part 93 binarizes the image. At step S43, the image processing part 93 clips the image in the range irradiated with light.

At step S44, the image processing part 93 obtains a centroid of the image from the clipped image. The applied light and the centroid are as shown in FIGS. 12A and 12B, for example.

Figure 12A:
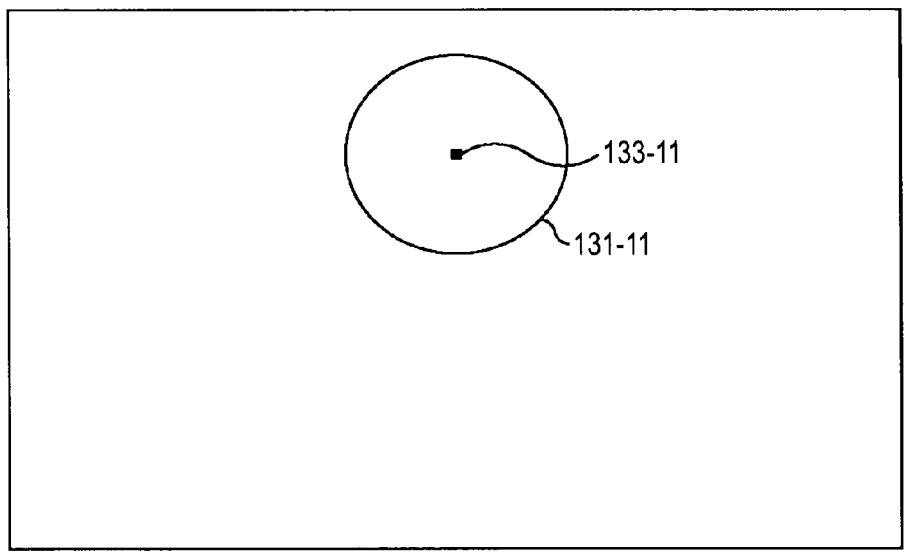
FIGS. 12A and 12B show examples of imaged images.
Figure 12B:
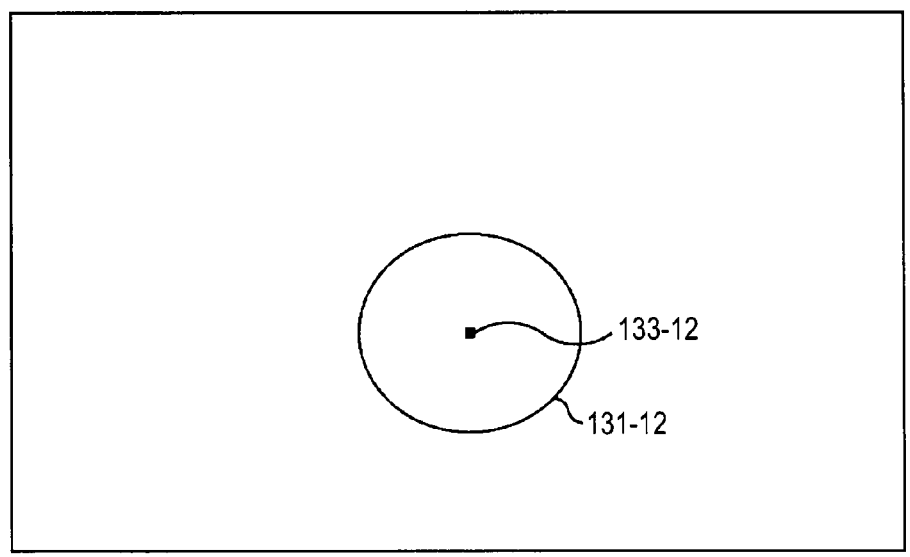

FIGS. 12A and 12B show examples of images imaged by the image sensor 21. In FIGS. 12A and 12B, the marks of the target object 31 are not shown, but only bright spots 131-11, 131-12 as ranges of reflected light are shown. The image processing part 93 obtains centroids 133-11, 133-12 from the bright spots 131-11, 131-12.

Hereinafter, if it is unnecessary to individually distinguish the centroids 133-11, 133-12 they may collectively be referred to as the centroid 133.

At step S45 of FIG. 10, the detection part 94 detects the distance between the image sensor 21 and the target object 31. A distance L11 between the image sensor 21 and the target object 31 is measured in advance with respect to each position coordinate of the centroid 133 based on experiments or simulations, and stored in the storage device 74.

Therefore, the distance L11 is detected by comparing the position coordinate of the detected centroid 133 with the position coordinate of the centroid defined in advance.

In the example of FIG. 12A, assuming that the upper side of the image is the light emitting part 19 side in FIG. 11, the bright point 131-11 is at the upper side of the image. Accordingly, it is known that the distance between the image sensor 21 and the target object 31 is shorter.

The bright point 131-12 of FIG. 12B is at the lower side of the image. Accordingly, it is known that the distance between the image sensor 21 and the target object 31 is longer than that in FIG. 12A.

Note that, in the embodiment, the distance between the operation input device 1 and the target object 31 is detected by obtaining the position of the centroid 133 of the bright point 131, however, the distance may be detected by using diverging light as the irradiation light 171 and obtaining a diameter or an area of the bright point 131.

The diameter of the diverging light becomes larger as the distance from the light emitting part 19 is longer. Accordingly, if the diameter of the bright point 131 is shorter, the distance between the operation input device 1 and the target object 31 may be detected to be shorter, and, if the diameter of the bright point 131 is longer, the distance between the operation input device 1 and the target object 31 may be detected to be longer.

For the detection of the distance, in addition, focus adjustment, an infrared sensor, or an ultrasonic sensor may be used.

Returning to FIG. 8, after the distance is detected at step S21 in the above described manner, at step S22, the determination part 98 determines whether the distance is equal to or more than a reference value or not. If the distance detected at step S21 is smaller than the preset reference value, the process moves to step S23.

At step S23, the computation part 95 computes velocity computation processing using the image sensor 21. The velocity computation processing is performed in the manner explained with reference to FIG. 5.

At step S24, the acquisition part 92 acquires the angular velocity detected by the angular velocity sensor 13.

At step S25, the computation part 95 corrects the velocity according to the following equation (1).

$$V = Vi + \omega \times L \qquad (1)$$

In the equation (1), V indicates the corrected velocity of the operation input device 1, L indicates the distance L11 detected at step S21, Vi indicates the velocity computed at step S23 (step S6 in FIG. 5), and ω indicates the angular velocity acquired at step S24, respectively. By independently computing the equation (1) in the X-axis direction and the Y-axis direction, the velocity of the operation input device 1 in the proximity may be obtained. Thereby, not only in the case where the surface of the target object 31 is a flat surface but also even in the case where the surface is a convex surface, a concave surface, or a composition of them, the velocity may accurately be detected.

Since the velocity is a movement distance per unit time, the distance may be obtained by multiplying the velocity by time (i.e., integration by time).

That is, as shown in FIG. 9, the operation input device 1 and the target object 31 are separated at a distance L91. Assuming that the operation input device 1 is translated by a distance L92 in parallel to the target object 31 in the position separated at the distance L91 from the target object 31, the distance when an axis 101 of the operation input device 1 is translated to the position shown as an axis 1C2 is L92. However, when the operation input device 1 is rotated during operation from the position shown as the axis 1C2 to the position shown as an axis 1C3, the distance obtained by multiplying the velocity obtained by the computation explained with reference to FIG. 5 by time is L93. The distance L92 does not become equal to the distance L91.

That is, when the operation input device 1 is translated, the image sensor 21 images the target object 31 in a position P1. However, when the operation input device 1 is rotated by an angle α, what is imaged is the target object 31 in a position P2. The distance L93 is shorter than the distance L92 by the distance L94 between the position P1 and the position P2.

Accordingly, in the equation (1), a velocity Vi corresponding to the distance L92 is corrected by a velocity ωL, corresponding to the distance L94.

Note that, when the operation input device 1 is in contact with the target object 31, because the distance L of the equation (1) is sufficiently small, the detected velocity Vi may be considered as the velocity of the operation input device 1.

At step S26, the command generation part 96 generates a command corresponding to the corrected velocity, for example. Thereby, for example, a command for moving a cursor at the velocity by the distance corresponding to the corrected velocity in the detected direction is generated.

At step S27, the transmission part 97 transmits a command from the transmitter 72 to the television receiver via the antenna 73. The television receiver moves the cursor being displayed in response to the command.

Note that the information including the direction, the velocity, and the distance may be transmitted to the television receiver without change, and commands based on the information may be generated at the television receiver side and recognized.

If the distance detected at step S22 is determined to be equal to or more than the preset reference value, a command for stopping the movement of the cursor is generated at step S26, and the command is transmitted at step S27. In other words, in this case, the operation of moving the cursor is substantially prohibited.

Note that, when the contact part 22 is in contact with the target object 31, a command corresponding thereto may be transmitted or information representing the contact may be transmitted together with the information of the direction, the velocity, the distance, or the like.

By obtaining the velocity of the operation input device 1 in the above described manner, the operation velocity from the contact to a predetermined range (the range in which the distance L may be detected or the range that may be imaged by the image sensor 21) may be consistent with the output velocity signal, and the operation input device 1 with good operability in a range from contact to proximity can be provided. As a result, not only pointing but also character input on the target surface including, for example, a desk surface or a curved surface, on the lap, for example, can easily be performed.

[Operation Commands]

FIG. 13 shows differences among operation commands in response to the distances between the image sensor 21 and the target object 31.

If the distance between the image sensor 21 and the target object 31 is a distance L141 equal to or more than a distance L0 as a reference value, the operation command of the operation input device 1 is for screen operation of "stop cursor operation".

If the distance between the image sensor 21 and the target object 31 is a distance L142 less than the distance L0 as the reference value, and additionally, the contact part 22 is not in contact with the target object 31, the operation command of the operation input device 1 is for screen operation of "cursor operation". That is, the cursor is moved in response to the operation.

If the distance between the image sensor 21 and the target object 31 is a distance at which the contact part 22 is not in contact with the target object 31, that is, "on" at the first step is detected by the tactile switch 23, the operation command of the operation input device 1 may be special operation such as "drag operation", "drawing operation", or the like in addition to "cursor operation". Further, if the contact part 22 is pressed down to the position where the second step of tactile switch 23 is turned on, a command of "determination operation" may be executed.

Note that, when the user presses down the button 15, the command of "stop cursor operation" may be executed. Further, if the distance between the image sensor 21 and the target object 31 is the distance L142, when the user presses down the button 15, the command of "drag operation" or "drawing operation" may be executed.

Further, under the condition that the contact part 22 is in contact with the target object 31 (that is, the first step of the tactile switch 23 is turned on), when the user presses down the button 15, or the contact part 22 is continuously pressed down to the position where the second step of the tactile switch 23 is turned on, the command for screen operation of "drag operation" or "drawing operation" may be executed.

Furthermore, if the distance between the image sensor 21 and the target object 31 is the distance L141, a command for screen operation of "scroll" may be executed, and, if the distance between the image sensor 21 and the target object 31 is the distance L142 or less, a command for screen operation of "cursor operation" may be executed.

Moreover, the image sensor 21 and the target object 31 is at the distance L141 larger than the distance L0 as the reference value, a command for screen operation based on the angular velocity as a physical quantity acquired from the angular velocity sensor 13 may be executed, and, if the image sensor 21 and the target object 31 is at the distance L142 smaller than the distance L0 as the reference value or less, a command for screen operation based on the velocity as another physical quantity acquired at step S25 of FIG. 8 may be executed.

In addition, using a pressure sensor for the contact part 22, if the contact part 22 is in contact with the target object 31, the command for screen operation of "drawing operation" may be executed while changing the thickness of the line in response to the strength with which the user presses down the target object 31.

[Noise Prevention]

Next, with reference to FIGS. 14 to 15B, a configuration for suppressing the influence by noise when the operation input device 1 is in contact with the target object 31 will be explained.

Figure 14:
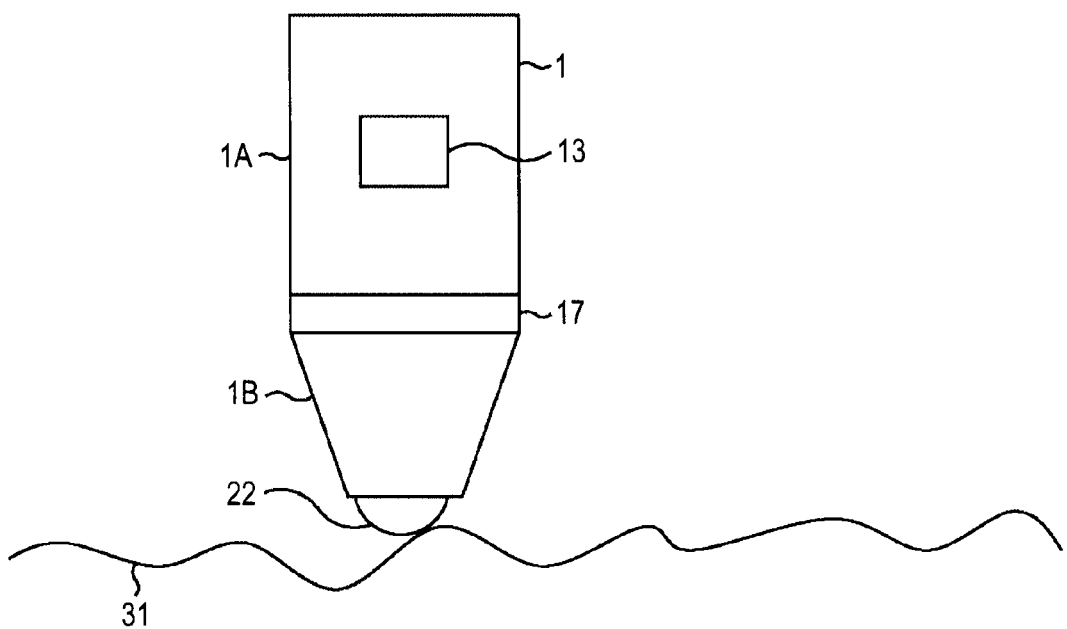
FIG. 14 shows an operation surface of the operation input device.

FIG. 14 shows the case where the operation input device 1 is in contact with the target object 31 having a coarse surface. The target object 31 having a coarse surface is jeans that the user is wearing, a pearskin-finished table, or the like.

Figure 15A:
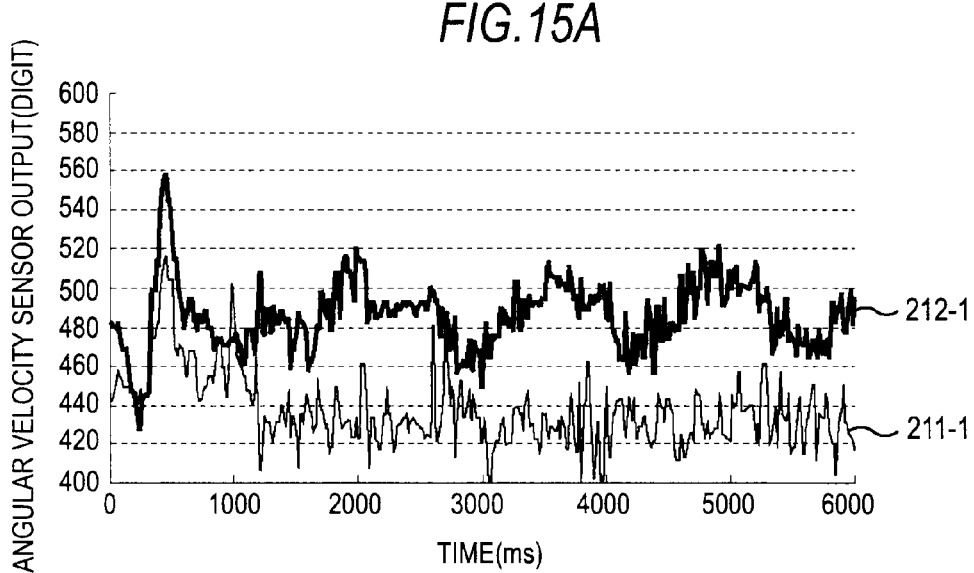
FIGS. 15A and 15B show outputs of an angular velocity sensor.

When the operation input device 1 is slid on the coarse surface, the angular velocity sensor 13 shows waveforms with a lot of noise as shown in FIG. 15A.

FIG. 15A shows output waveforms of the angular velocity sensor 13 when the user uses the operation input device 1 on the target object 31 having a coarse surface and describes a circle.

In FIG. 15A, the horizontal axis indicates time (ms) and the vertical axis indicates output (DIGIT) of the angular velocity sensor 13, respectively. In FIG. 15A, an output waveform 211-1 in the X-axis direction and an output waveform 212-1 in the Y-axis direction of the angular velocity sensor 13 are shown.

As shown in FIG. 15A, the output waveform 211-1 in the X-axis direction and the output waveform 212-1 in the Y-axis direction contain a lot of noise. Accordingly, even using a filter, it may be impossible to sufficiently remove the noise components.

Accordingly, in the embodiment, as shown in FIG. 14, the buffer material 17 is sandwiched between the casing 1B that supports the contact part 22 and the casing 1A that supports the angular velocity sensor 13.

The buffer material 17 includes a synthetic resin of a urethane viscoelastic material such as SORBOTHANE (registered trademark), rubber, or another viscoelastic material. The transfer of the vibration generated in the contact part 22 to the angular velocity sensor 13 via the casing 1B, the casing 1A is suppressed by the buffer material 17.

Figure 15B:
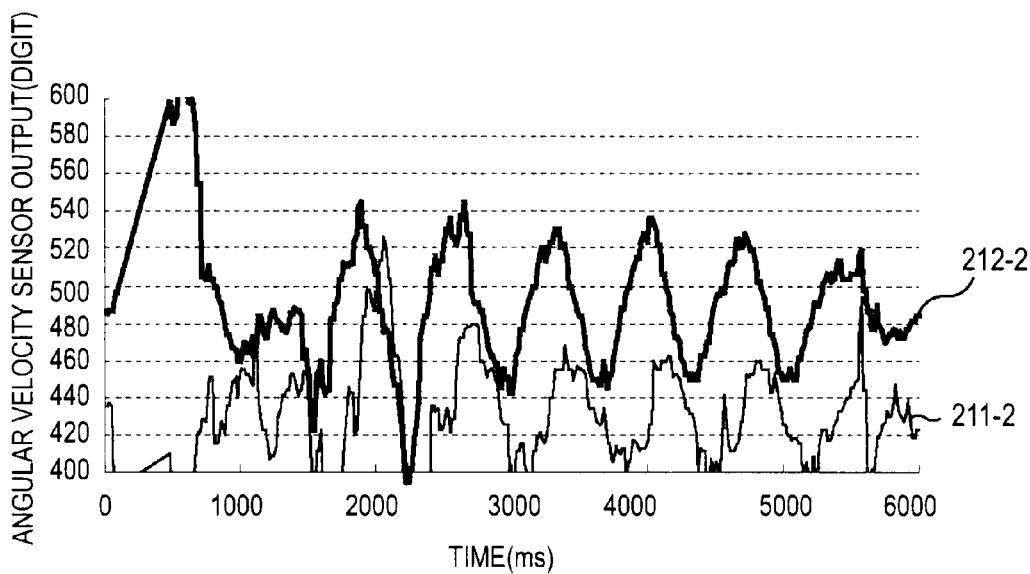

FIG. 15B shows output waveforms of the angular velocity sensor 13 when the user uses the operation input device 1 with the buffer material 17 sandwiched between the contact part 22 and the angular velocity sensor 13 on the target object 31 having a coarse surface and describes a circle.

Note that, FIG. 15B shows the output waveforms of the angular velocity sensor 13 when the user describes a circle different from the circle described in FIG. 15A.

It is known that, in an output waveform 211-2 in the X-axis direction and an output waveform 212-2 in the Y-axis direction of the angular velocity sensor 13 of FIG. 15B, the noise as high-frequency components is pressed down compared to the output waveform 211-1, the output waveform 212-1 of FIG. 15A.

Therefore, by sandwiching the buffer material 17 between the contact part 22 and the angular velocity sensor 13, the vibration of the contact part 22 may be relaxed and the noise of the output waveforms of the angular velocity sensor 13 may be reduced. That is, the operation input device 1 may reflect the operation even when it is in contact with the target object 31 having the coarse surface.

[Calibration of Angular Velocity Sensor 13]

Next, with reference to FIG. 16, calibration processing of the angular velocity sensor 13 using the image sensor 21 will be explained.

Figure 16:
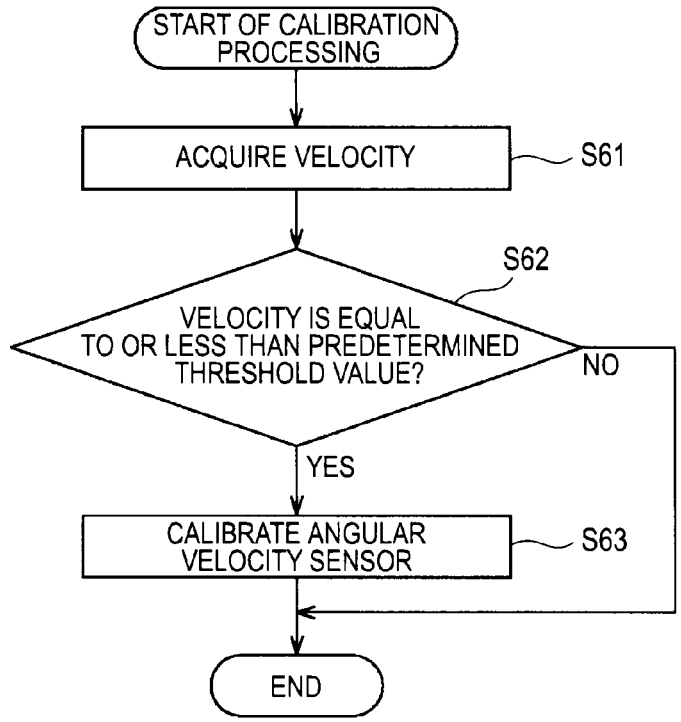
FIG. 16 is a flowchart for explanation of calibration processing of the angular velocity sensor.

FIG. 16 is a flowchart for explanation of the calibration processing of the angular velocity sensor 13.

At step S61, the acquisition part 92 acquires the velocity obtained in the velocity computation processing in FIG. 5.

At step S62, the determination part 98 determines whether the acquired velocity is equal to or less than a predetermined threshold value or not.

If the acquired velocity is determined to be equal to or less than the predetermined threshold value, at step S63, the control part 91 executes calibration of DC (Direct Current) offset of the angular velocity sensor 13.

The calibration of DC offset is to set the DC output of the angular velocity sensor 13 to a predetermined reference output, i.e., the output when the angular velocity is zero.

At step S62, if the acquired velocity is determined to be more than the predetermined threshold value, the processing at step S63 is skipped and the process is ended.

This is the end of the calibration processing of the angular velocity sensor 13.

[Slide Velocity Computation Processing]

Figure 17:
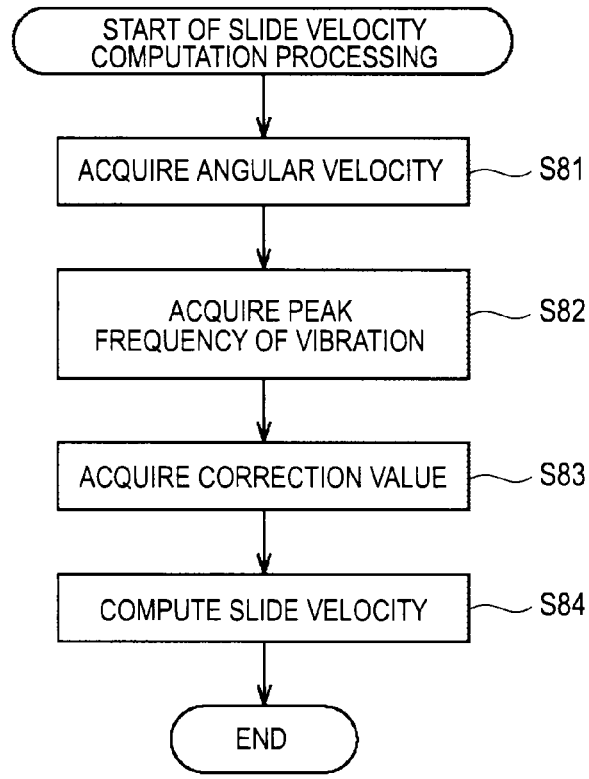
FIG. 17 is a flowchart for explanation of slide velocity computation processing of the operation input device.

Next, with reference to FIG. 17, processing of computing another velocity of the operation input device 1 than that in FIG. 5 will be explained. FIG. 17 is a flowchart for explanation of slide velocity computation processing of the operation input device 1.

In the embodiment, if the operation input device 1 is slid in contact with the target object 31, the velocity is estimated using the angular velocity sensor 13 in place of the image sensor 21.

At step S81, the acquisition part 92 acquires the angular velocity detected by the angular velocity sensor 13.

At step S82, the acquisition part 92 acquires a peak frequency of vibration generated at sliding of the operation input device 1 from the angular velocity acquired at step S81. The peak frequency of the vibration may be acquired from a signal obtained by collection of the sound at sliding using the microphone 16. The frequency of the vibration at sliding may be detected from vibration propagated via component elements.

The frequency of the vibration of the operation input device 1 is proportional to the velocity of the operation input device 1. That is, when the frequency of the vibration of the operation input device 1 is high, the movement velocity of the operation input device 1 is high.

At step S83, the acquisition part 92 acquires a correction value in response to the peak frequency. The correction value is defined in response to the peak frequency and stored in the storage device 74 in advance.

At step S84, the computation part 95 computes the slide velocity of the operation input device 1 by multiplying the angular velocity acquired in the processing at step S81 by the correction value acquired in the processing at step S83.

That is, in the embodiment, the angular velocity detected by the angular velocity sensor 13 is used as a representative of amounts of operation of the operation input device 1. Using only the angular velocity, the translation component at sliding operation is not sensed and the amount of operation by the user is inconsistent with the operation output. Accordingly, the above described correction processing is performed.

Note that, in place of the angular velocity, acceleration may be detected and differentiated, and thereby, the slide velocity may be estimated.

This is the end of the slide velocity computation processing of the operation input device 1.

Thereby, the operation input device 1 may compute the slide velocity at contact without using the image sensor 21.

[Gesture Detection]

Next, with reference to FIGS. 18A to 18C, gesture detection of the operation input device 1 will be explained. A gesture is detected based on output waveforms of the angular velocity sensor 13.

The gesture refers to flick, reciprocating operation, operation of describing a circle, or the like by the operation input device 1 in contact with the target object 31, for example.

Figure 18A:
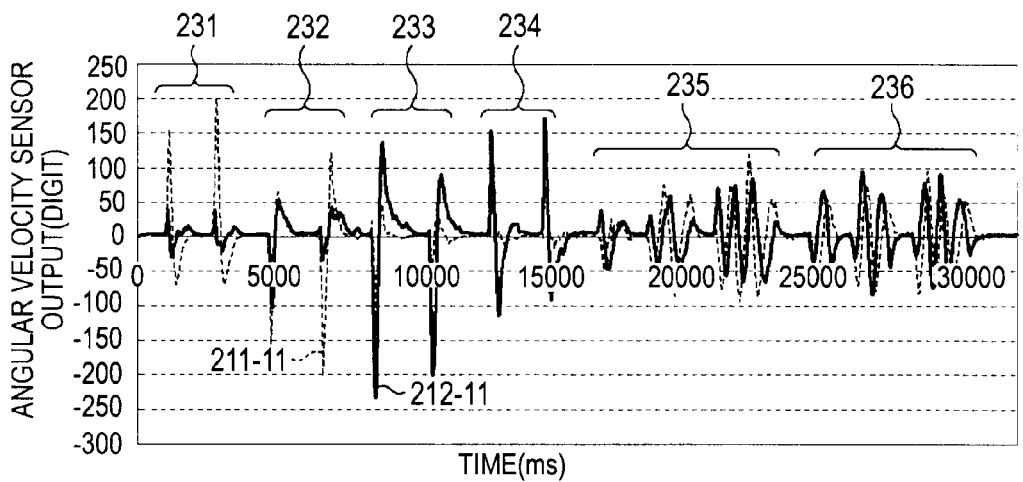
FIGS. 18A to 18C show outputs of the angular velocity sensor.

FIG. 18A shows outputs of the angular velocity sensor 13 when the user executes the reciprocating operation and the operation of describing a circle under the condition that the operation input device 1 is in contact with the target object 31.

In FIG. 18A, an output waveform 211-11 in the X-axis direction and an output waveform 212-11 in the Y-axis direction of the angular velocity sensor 13 with the two axes are shown.

The output waveform 211-11 in the X-axis direction takes a positive value when the operation input device 1 is moved rightward, and takes a negative value when the device is moved leftward. Further, the output waveform 212-11 in the Y-axis direction takes a positive value when the operation input device 1 is moved toward the front of the user, and takes a negative value when the device is moved in the depth direction of the user.

FIG. 18A shows a waveform 231 of the rightward operation, a waveform 232 of the leftward operation, a waveform 233 of the operation toward the front, a waveform 234 of the operation in the depth direction, a waveform 235 of the operation of describing a circle clockwise, and a waveform 236 of the operation of describing a circle counter-clockwise.

As the waveforms 231 to 234 in the reciprocating operation, waveforms of operation in the respective directions twice are shown. As the waveforms 235, 236 in the operation of describing circles, waveforms of operation in the respective directions three times are shown.

In the waveform 231 of the rightward operation, the output waveform 211-11 in the X-axis direction largely changes in the positive direction. In the waveform 232 of the leftward operation, the output waveform 211-11 in the X-axis direction largely changes in the negative direction.

In the waveform 233 of the operation toward the front, the output waveform 212-11 in the Y-axis direction largely changes in the negative direction. In the waveform 234 of the operation in the depth direction, the output waveform 212-11 in the Y-axis direction largely changes in the positive direction.

As described above, the gestures of the reciprocating operation may be detected from the changes of the output waveforms of the angular velocity sensor 13 as gesture detecting means respectively corresponding to them.

In the waveform 235 of the operation of describing a circle clockwise, the output waveform 211-11 in the X-axis direction first changes, and then, the output waveform 212-11 in the Y-axis direction changes with a phase difference of 90 degrees. Further, in the waveform 236 of the operation of describing a circle counter-clockwise, the output waveform 212-11 in the Y-axis direction first changes, and then, the output waveform 211-11 in the X-axis direction changes with a phase difference of 90 degrees.

As described above, regarding the gesture of the operation of describing a circle, its rotational direction may be detected based on either the output waveform 211-11 in the X-axis direction or the output waveform 212-11 in the Y-axis direction first changes.

Figure 18B:
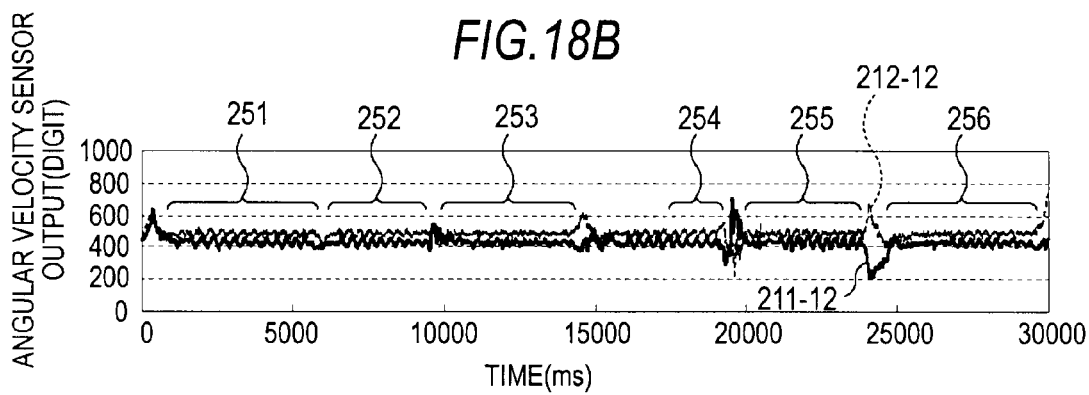

FIG. 18B shows outputs of the angular velocity sensor 13 when the user executes the operation of describing a circle on various target objects.

In FIG. 18B, an output waveform 211-12 in the X-axis direction and an output waveform 212-12 in the Y-axis direction of the angular velocity sensor 13 are shown.

FIG. 18B shows an output waveform 251 when a palm is used as a target surface, an output waveform 252 when there is no contact with the object surface (in the air), an output waveform 253 when a desk surface is used as the target surface, an output waveform 254 when jeans are used as the target surface, an output waveform 255 when a housing of a personal computer is used as the target surface, and an output waveform 256 when a liquid crystal display of a personal computer is used as the target surface.

As shown in FIG. 18B, the respective waveforms 251 to 256 show the similar waveforms. This means that the gestures of the operation of describing circles may be detected independent of the target object.

Figure 18C:
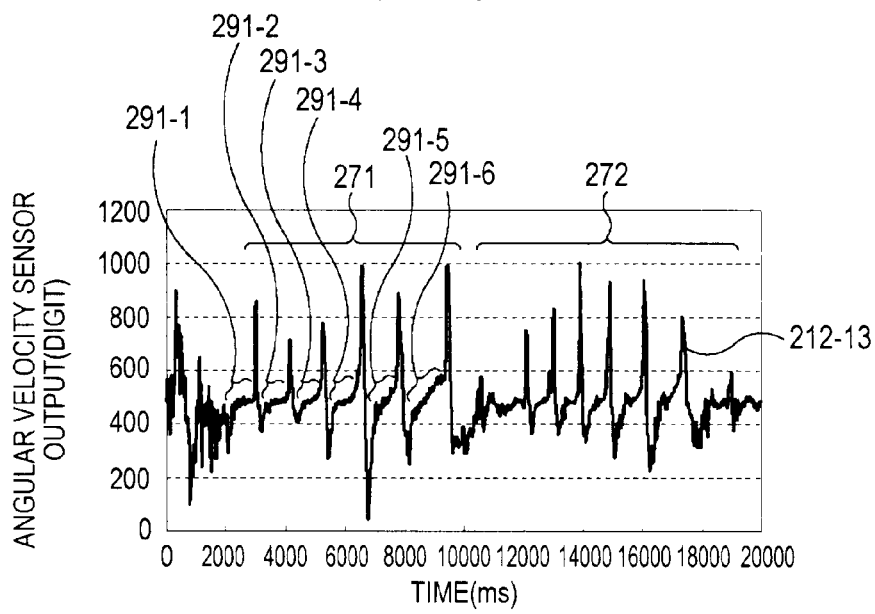

FIG. 18C shows output waveforms of the angular velocity sensor 13 when the user executes flick operation. In FIG. 18C, an output waveform 212-13 in the Y-axis direction of the angular velocity sensor 13 is shown.

FIG. 18C shows an output waveform 271 when a desk surface is used as the target surface and an output waveform 272 in no contact with the object surface (in the air). In the output waveform 271 when the desk surface is used as the target surface and the output waveform 272 when there is no contact with the object surface, respectively, six flicks are shown and the times to flick are sequentially longer from the left side.

The output waveform 271 when the desk surface is used as the target surface and the output waveform 272 when there is no contact with the object surface show the similar waveforms.

When flicking is executed on the desk, the contact part 22 is pressed down at flicking. The locations where the contact part 22 is pressed down at flicking are shown by flicking locations 291-1 to 291-6.

The flicking time in the flicking location 291-N (N is a natural number from "1" to "6") is longer as the N is larger as described above.

In this manner, the flick gestures may be detected independent of the target object, and the differences in time of flicking may be detected.

The gestures may be detected based on the outputs of the image sensor 21.

The operation input device 1 may be electronic apparatus.

The embodiments of the invention are not limited to the above described embodiments, but various changes may be made without departing from the scope of the invention.

The present application contains subject matter related to that disclosed in Japanese Priority Patent Application JP 2009-286218 filed in the Japan Patent Office on Dec. 17, 2009, the entire contents of which is hereby incorporated by reference.

What is claimed is:

1. An electronic apparatus, comprising:
circuitry configured to:
 detect an angular velocity;
 contactlessly detect a relative velocity to a target object;
 detect a distance to the target object;
 compute an amount of movement based on the angular velocity, the relative velocity, and the distance;
 detect a frequency of vibration at sliding if there is contact with the target object;
 acquire a correction value based on the detected frequency; and
 compute a corrected velocity at the sliding based on the correction value and the angular velocity.

2. The electronic apparatus according to claim 1, the circuitry being further configured to contactlessly detect the relative velocity by:
 emitting light to illuminate the target object; and
 imaging the target object irradiated with the emitted light, wherein the detected distance is detected based on an image of the target object.

3. The electronic apparatus according to claim 2, the circuitry being further configured to detect contact with the target object.

4. The electronic apparatus according to claim 3, the circuitry being further configured to detect two-step contact.

5. The electronic apparatus according to claim 4, further comprising a buffer material that suppresses transfer of vibration, generated at contact with the target object, to the circuitry configured to detect the angular velocity.

6. The electronic apparatus according to claim 5, wherein, if the distance to the target object is equal to or more than a reference range, screen operation is stopped,
 if the distance to the target object is less than the reference range, screen operation is executed, and
 if there is contact with the target object, special operation is executed.

7. The electronic apparatus according to claim 5, wherein, if the distance to the target object is equal to or more than a reference range, first screen operation is executed, and if the distance to the target object is within the reference range, second screen operation is executed.

8. The electronic apparatus according to claim 5, wherein, if the distance to the target object is equal to or more than a first range within the reference range, screen operation based on a first physical quantity is executed, and if the distance to the target object is less than the first range within the reference range, screen operation based on a second physical quantity is executed.

9. The electronic apparatus according to claim 1, the circuitry being further configured to detect the frequency of vibration at sliding from sound.

10. The electronic apparatus according to claim 1, the circuitry being further configured to combine the frequency detecting and the angular velocity detecting, and the angular velocity detecting further detects the frequency of vibration at sliding.

11. The electronic apparatus according to claim 1, the circuitry being further configured to detect a gesture based on the angular velocity if there is contact with the target object.

12. An operation input method of an electronic apparatus, comprising:

detecting, using circuitry, an angular velocity;

contactlessly detecting, using the circuitry, a relative velocity to a target object;

detecting, using the circuitry, a distance to the target object;

computing, using the circuitry, an amount of movement based on the angular velocity, the relative velocity, and the distance;

detecting, using the circuitry, a frequency of vibration at sliding if there is contact with the target object;

acquiring, using the circuitry, a correction value based on the detected frequency; and computing, using the circuitry, a corrected velocity at the sliding based on the correction value and the angular velocity.

13. A nontransitory computer-readable storage medium encoded with a program causing a computer to execute the steps of:

detecting, using circuitry, an angular velocity;

contactlessly detecting, using the circuitry, a relative velocity to a target object;

detecting, using the circuitry, a distance to the target object;

computing, using the circuitry, an amount of movement based on the angular velocity, the relative velocity, and the distance;

detecting, using the circuitry, a frequency of vibration at sliding if there is contact with the target object;

acquiring, using the circuitry, a correction value based on the detected frequency; and computing, using the circuitry, a corrected velocity at the sliding based on the correction value and the angular velocity.

14. An operation input device, comprising:

circuitry configured to:

detect an angular velocity;

contactlessly detect a relative velocity to a target object;

detect a distance to the target object;

compute an amount of movement based on the angular velocity, the relative velocity, and the distance;

detect a frequency of vibration at sliding if there is contact with the target object;

acquire a correction value based on the detected frequency; and compute a corrected velocity at the sliding based on the correction value and the angular velocity.

* * * * *